United States Patent Office 3,562,737
Patented Feb. 9, 1971

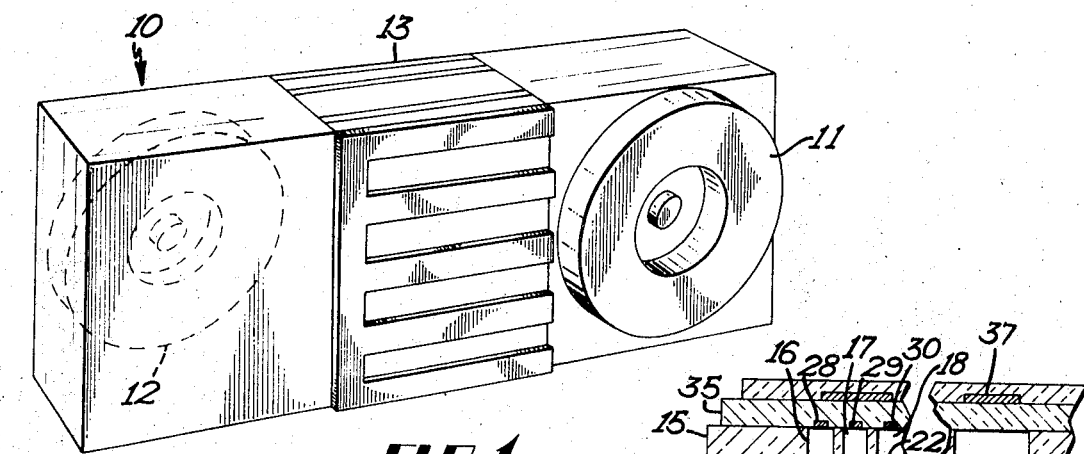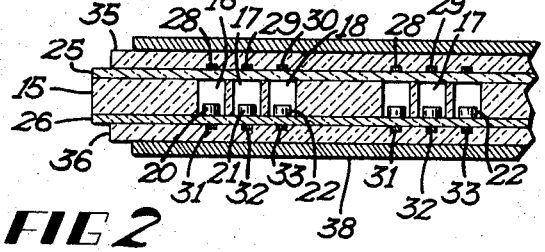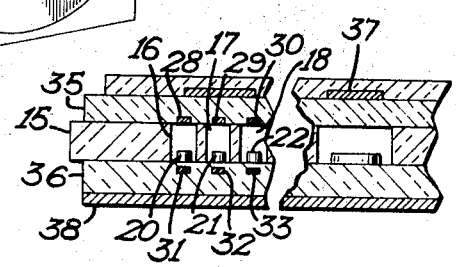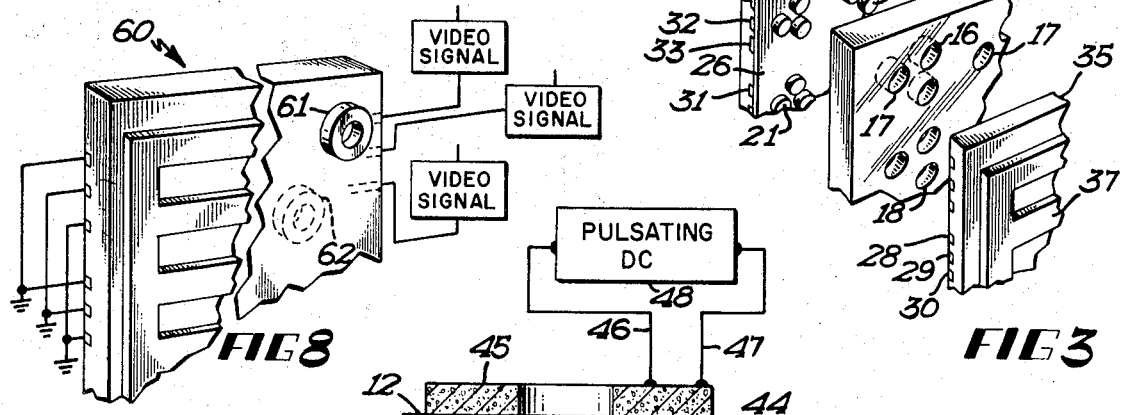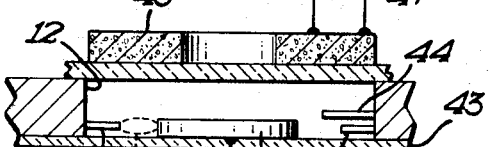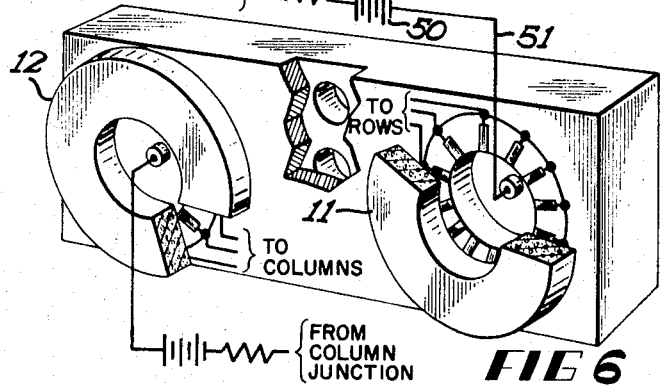

3,562,737
ELECTRO-OPTICAL DEVICE
Norman M. Wiederhorn, Golden Valley, and Charles Robert Lane, Northfield, Minn., assignors to G. T. Schjeldahl Company, Northfield, Minn., a corporation of Minnesota
Filed Dec. 19, 1967, Ser. No. 691,779
Int. Cl. H05b 41/00
U.S. Cl. 340—325                    12 Claims

ABSTRACT OF THE DISCLOSURE

An electro-optical device having a plurality of superimposed layers, and including a central panel having a plurality of discrete bores extending therethrough to form display cells for receiving and retaining an electro-optical substance, which substance may include an ionizable gaseous fill, and a plurality of scanning electrodes on opposite sides of said cells for applying an electrical field through each of said cells. The display cells are arranged in groups of rows and columns, and scanning electrodes extend beyond the area of the cells and into a remote chamber, wherein a gap is formed in the continuity of each of the scanning electrodes. These gaps are arranged in two groups or banks, one group for the rows, the other for the columns. A magnetic drive means is provided to generate a field which is coupled to the gaps in the individual groups, and means are provided for energizing the magnetic means to intermittently step an arc formed in the gaps from one gap pair to another gap pair along the gap axis.

---

The present invention relates generally to an electro-optical display panel and more particularly to an electro-optical display panel having an improved and self-contained means for energizing the panel in order to create the display. More particularly, the present invention pertains to a system including a scanning mechanism in combination with an electro-optical panel, this system including, preferably, in one enclosure, an electro-optical display panel having a plurality of discrete cells formed therein, and electrode means for applying a field to opposite sides of each of said cells, wherein the individual scanning electrodes are disposed in generally mutually orthogonal relationship on opposite surfaces of the panel. The lead lines for each of the scanning electrodes are provided with a gap along the extent thereof, and magnetic means are provided for generating a field which is coupled to the individual gaps, the magnetic means being energized in order to intermittently step an established arc from one gap pair to another gap pair along the axis of the gaps.

In the past, various elaborate circuitry arrangements and systems have been proposed and provided for the scanning and triggering of various electro optical display panels, particularly those electro optical display panels containing a large number of discrete areas of electro-optical material. These systems generally involve elaborate and expensive components, and are cumbersome in size and arrangement. The cost is accordingly high and the complexity great. These switching systems normally cannot be self-contained in the same environment with the panel, and are necessarily disposed at a distance from the display panel. Long leads create difficulties with regard to electrical parameters, cross-talk, and the like.

In accordance with the present invention, a highly compact display panel is provided which may include, as a self-contained unit, the necessary scanning and triggering circuitry for display purposes. The system is one which may be prepared without requiring unusual equipment or preparation techniques. The circuitry for scanning the display panel is straightforward, with each of the scanning lines being of substantially the same length, the system being one which does not have a requirement for the high voltages normally utilized in conventional display tube apparatus. The cut-off of the image may be sharp, such as is obtained in a gas-filled electro-optical panel, or if desired, the image may persist when a phosphor is utilized in the individual electro-optical display cells. It is further appreciated that circuitry may be utilized to retain an image in or along the panel, since the information may remain so long as a proper "maintaining" potential is applied to the scanning electrodes or so long as a signal is present on informational or signal electrodes. The intensity of the image may be controlled by the strength and frequency of the field across the cell, direct control of the intensity of phosphors being possible by the amplitude of the potential existing across the cell.

It is preferable that the active and passive components of the display apparatus of the present invention be built up from a plurality of layers, preferably layers of thin films which may be applied or deposited across the various substrate surfaces. When thin films are utilized, it is possible to more precisely control the operation of the display panel, since the applied fields will be more uniformly impressed across the individual cells, and the operation of the structure will be accordingly more predictable than would be possible if relatively heavy or thick layers were being considered. The substrate as well as the active and passive films of the apparatus may be fabricated from flexible materials, if desired.

In order to control the application of the scanning potential to the system, two sets of mutually orthogonal scanning electrodes are provided. These electrodes are arranged on opposite sides of the individual cells in the form of rows and columns respectively. The lead lines for each of the electrodes is provided with a gap zone therein. Means are provided to initiate an arc across at least one of these gaps, and the stepping motion of the arc in the gap is controlled by means of a magnet having a field which is coupled to the area of the arc. A controlled pulsed DC potential on an electromagnet, for example, may be utilized to step the arc from one electrode terminal pair to another, as may be required in the program for the display panel. This system provides a desirable technique for controlled switching in the scanning circuit, and also provides for a complete self-contained system. When utilized, the gas-fill for the display cells is preferably the same gas-fill that is utilized in the gap-switching zone, thus, the entire panel may be simultaneously filled with the gas desired in the system.

Therefore, it is an object of the present invention to provide an improved electro optical display panel having a plurality of discrete electrooptical cells filled with a certain electro-optical gas, the panel assembly containing as a portion thereof a magnetically actuated switching mechanism which utilizes an arc between spaced apart electrodes, the disposition of the arc being controlled by an applied magnetic field.

It is yet a further object of the present invention to provide an improved electro-optical display panel having a plurality of discrete electro-optical cells disposed in predetermined relationship therethrough, the panel including a self-contained switching apparatus utilizing a plurality of lines each having a gap therein and adapted to receive an arc which extends between spaced apart electrodes, the disposition of the arc being controlled by an applied magnetic field, the switching mechanism preferably utilizing the same gas-fill which is employed in the electro-optical display panel.

It is yet a further object of the present invention to provide an electro-optical display panel having a plurality of discrete electro-optical cells disposed in predetermined relationship thereabout, these cells being provided with an electrically excited phosphor for creating persistance in an image created in the electro-optical cell.

It is yet a further object of the present invention to provide an improved technique for controlling the establishment and arrangement of electrical fields across the individual electro-optical cells.

Other and further objects of the present invention will become apparent to those skilled in the art upon a study of the following specification, appended claims, and accompanying drawing wherein:

FIG. 1 is an exploded perspective view showing the electro-optical panel system fabricated in accordance with the present invention;

FIG. 2 is a partial sectional view taken through the display panel segment of an electro-optical display panel system prepared in accordance with the present invention;

FIG. 3 is an exploded perspective view of a display panel portion of an electro-optical display panel system prepared in accordance with the present invention, and illustrating a system capable of displaying color;

FIG. 4 is a sectional view of a display panel prepared in accordance with the present invention, and illustrating two types of display panels which may be utilized, and enclosing phosphors therein;

FIG. 5 is a sectional view illustrating the mechanism for controlling the switching in the display panel apparatus of FIG. 3;

FIG. 6 is a partial perspective view illustrating the manner in which the scanning control is coupled to a display panel segment of a system;

FIG. 7 is a schematic of a typical circuitry application utilizing alternating current signals in the scanning and shifting circuits; and FIG. 8 is a detail perspective view of a portion of the display panel shown in FIG. 3, typically a flat television screen panel, this view illustrating the tying of the various color lines at one end of the system.

In accordance with the preferred modification of the present invention, and with reference to FIG. 1 of the drawings, the electro-optical display panel system generally designated 10 includes a row scanning control segment 11, a column scanning control segment 12, and a display panel segment 13 disposed therebetween. While the scanning control devices have been shown disposed in isolated disposition on opposite sides of the display panel, it will be appreciated that these devices may both be disposed on the same side of the display panel portion, if desired, provided the fields are properly isolated, one from another.

With particular reference to FIG. 2 of the drawings, a typical display panel includes a central panel 15 having a plurality of bores formed therein, such as, for example, those bores forming the confines for the individual cells 16, 17 and 18. Also, within the cells, a phosphor element may be deposited, such as at 20, 21 and 22. In a color system, these individual phosphors will, of course, be excited to emit radiation in various color spectrums, such as, for example, a red emitting phosphor at 20, a blue emitting phosphor at 21, and a green emitting phosphor at 22. While the precise mechanism of the individual phosphors is not completely understood, it has been found that they will emit in the presence of an electrical field, and this radiation will persist after the field has collapsed. Also, if desired, phosphors will emit in the presence of a glow discharge in an inert gas, and thus a panel can have persistence in emission even though a signal is applied only for a short period of time. Obviously, the color emitted by the gas should be compatible with that emitted by the phosphor. Normally, phosphors are voltage sensitive, and the intensity of the applied field can be controlled to obtain a modulated video output, if desired.

Gas discharge devices and phosphor emission devices have "thresholds" of voltages applied across a cell below which the cell will not emit. However, voltages in excess of the "threshold" will cause emission to occur. This phenomena is utilized to advantage in the apparatus of the present invention.

The individual cells formed in the center panel 15 are encapsulated between closure surfaces or films 25 and 26. Signal electrodes 28, 29 and 30 along with corresponding counter-electrodes 31, 32 and 33 are provided on opposite sides of the cells. These electrodes are utilized to carry a signal voltage, which will be more completely explained hereinafter. These signal electrodes are disposed in an insulating member such as the insulating members 35 and 36. Scanning electrodes 37 and 38 are utilized to apply a field to the individual cells, as more fully explained hereinafter. These scanning electrodes are, as indicated, arranged in mutually orthogonal relationship, one to another; one group being arranged in rows, the other group being arranged in columns.

With particular attention being directed to the switching apparatus shown in detail in FIGS. 5 and 6, it will be observed that the row scanning control system 11 is disposed within the confines of a chamber 12 formed in the central panel member, such as along one lateral end area of the central panel member 15. This control includes a common anode or central electrode 40, along with a plurality of counter-electrodes 41—41. The space between the surfaces of the central electrode 40 and the counter-electrodes 41 is such as to accommodate an arc such as is shown at 42 therebetween. Electrode 44 may be utilized, if desired, to initiate an arc which may be caused to move in a predetermined pattern, as more fully explained hereinafter. An electromagnet in the form of a toroidal core 45 having leads 46 and 47 extending therefrom, and coupled to a source of pulsating DC, such as at 48, is provided. This core establishes a magnetic field which is coupled to the gap area existing between the central electrode 40 and the individual counter-electrodes 41. The effect of the field established by the magnet will be to step a radially extending arc in a circumferential direction, in either clockwise or counterclockwise direction, depending upon the polarity of the source of energy for the magnet, such as the source 48. The column scanning control 12 is essentially the same as the row scanning control 11, the only difference being, in certain instances, a capability in various preedtermined frequencies.

The power for the establishing and maintaining of an arc, such as at 42, is available from the DC power supply 50. Conductor 51 is utilized to couple one side of the power source 50 to the central electrode 41, the other side being coupled to the common return conductor 52, which extends from a common point at the terminal of the individual scanning electrodes.

The gas fill for the chamber housing the switching mechanism is preferably a noble gas such as argon, xanon or neon, filled to a pressure of about 1 atmosphere. Argon at 1 atmosphere is a suitable fill. This gas at this pressure is sufficient to control the definition of the discharge, and will prevent the occurrence of a glow-type discharge.

In operation, the scanning electrodes are utilized to impress a field across the electro-optical cell which field is normally inadequate for emission to occur. In the case of an electro-optical gas, the field applied across the cell is generally at or above the valley of the Paschen curve representative of the discharge occurring in this device. In order to excite the cell into electroluminescence, an additional potential is applied in synchronism across signal electrodes disposed on opposite sides of the cell, the signal being coincident with the occurrence of the scanning signal. Thus, the field created by the scanning electrodes "conditions" the individual cells in order that they may be excited into electroluminescence by the simultaneous occurrence of a reinforcing field established by signal electrodes. Proper synchronization will be utilized to establish the programming necessary for this device.

In order to eliminate any possibility of light energy from the arcs formed in the scanning control chambers, an opaque shield will normally be employed around the chamber, such as the opaque shield 43.

When the individual electro optical cells are filled with an inert gas, it has been found that a field will persist across the cell after the applied field has been removed. This stray field has an effect in subsequent energizing of the cells, that is, the potential required to "fire" the cells is reduced. In order to minimize the effect of this residual or stray field, alternating current pulses may be utilized on successive scanning events, and thus render the insulating substrates more nearly neutral at all times.

This phenomenon is possible if the energy in the arc and the magnetic field are in synchronism, coinciding in the phase. Thus, the movement of the arc will be constant in its direction of travel, and its angular velocity will depend upon the frequency of the applied signals. This feature is shown in the schematic of FIG. 7, wherein the scanning signal is obtained from the signal generator 55, and the signal for the toroidal core illustrated at 56 is obtained from the signal generator 57. The gap zone is shown within the confines of the coil 56, such as at 58. With the signal generators 55 and 57 operating in synchronism and coinciding in phase, the arc may be caused to be pulsed about the family of gaps arranged, as illustrated in FIGS. 5 and 6.

With particular attention being directed to FIG. 8 of the drawings, it will be seen that a typical television display screen such as the display screen 60 may be provided utilizing a pair of switching means 61 and 62 similar to those illustrated in FIGS. 5 and 6, and utilizing, for example, at least 262 lines for accepting a video signal and displaying the signal on the device 60. The horizontal and vertical scan electrodes are energized in synchronism with the video signal, and accordingly will be capable of presenting the image, as received from the transmitter.

For a typical display screen prepared in accordance with the illustrations of FIG. 2, for example, the central panel 15 may preferably be formed of a material such as molded polyethylene, molded polypropylene, or the like. This panel will have a thickness of about 5 mils, and will include the plurality of bores formed therein, such as the bores forming the confines for the individual cells 16, 17 and 18. Also, it is within the contemplation of the concept to employ a plurality of interlocking plates, which are linked together on their edges so as to form a plurality of individual bores to receive a fill of a noble gas or the like. When formed in this fashion, the system must employ a technique for isolating the individual bores, one from another, and this may be performed by application of a film of material to the surfaces of the joined strips, thus forming effectively isolated "bores" or "compartments." The materials of construction for the closure surfaces or films 25 and 26, is preferably a film material such as stress-oriented polyethylene terephthalate (Mylar) or the like. The signal electrodes 28, 29 and 30, for example, are preferably formed as a film of stannous oxide or the like. These film forming techniques are, of course, generally known in the art, and require no specific explanation here. The corresponding counterelectrodes 31, 32 and 33 are similarly prepared. The remaining films are preferably formed of stress-oriented polyethylene terephthalate or similar materials. If desired, films of polyethylene terephthalate or other polyester substances may be formed in-situ by means of appropriate spray techniques or the like. These films ideally have a thickness in the range of about 1 mil, so as to provide significant flexibility in the product.

It will be appreciated that the toroidal core as utilized in the switching mechanism may be formed of individual blocks of ferrite, appropriately wound, if desired. It will be further appreciated, of course, that film-forming techniques may be employed to apply a film of a ferrite material to a specific location on a substrate surface, this being performed in combination with steps for applying a signal winding to the film of ferrite by means of vapor deposition operations. Insulative surfaces, when needed, may also be applied by conventional vapor deposition operations, utilizing, for example, silicon monoxide or the like.

For high production purposes, it will be appreciated that the central panel 15 may be formed by extrusion techniques, if desired. Thus, discrete bores may be formed in the device as it is extruded along the axis of the individual bores, conventional slicing techniques being utilized to separate individual panels from the extruded mass.

The apparatus of the present invention has application to digital display systems. Its adaptability to such a system is readily apparent, with the application of synchronized horizontal and vertical scanning signals. If desired, for digital read-out purposes, the system may include a triggering network which will maintain or retain a "maintaining" signal to any of the individual cells which become excited into luminescence during the digital read-out operation. The time and extent of any such read-out will, of course, depend upon the nature of the ultimate use or purpose of the read-out.

It is possible to employ the concept of the present invention for use as a component in a transmitting system, that is, a photosensitive means can be utilized to trigger the individual cells into conduction, this being coupled with an appropriate synchronization of horizontal and vertical scan signals. As an example, a photo-diode may be employed to detect the presence of a radiant signal of sufficient intensity to permit the appropriately combined cell to be excited into luminescence. The signals obtained from the array may then be converted and utilized, as required.

In order to step the arcs in the horizontal and vertical scan systems along in a predetermined fashion, a preselected line, for example a line in the horizontal scan, may be coupled as an input to the drive for the magnetic field generator coupled to the vertical scan, and upon each pulsing event for the pre-selected horizontal line, the vertical scan may be advanced by one increment according to the pulse thus received or delivered to the vertical scan.

It will be appreciated, therefore, that the various examples disclosed herein are for purposes of illustration only, and those skilled in the art may depart from these specific examples without necessarily departing from the spirit and scope of the present invention.

We claim:
1. In an electro-optical display panel:
    (a) a central panel having a plurality of discrete discharge paths extending therethrough, and closure means disposed along opposite faces of said central panel enclosing each of said paths to form a plurality of discrete display cells; each display cell being arranged to receive and retain a fill of an electro optical substance;
    (b) scanning electrode means on opposite end surfaces of each of said paths for applying an electrical field generally axially of each path; said scanning electrode means including a plurality of individual electrodes and forming first and second groups of electrodes, the first group being arranged generally in rows along one end of said cells, the second group being arranged generally in columns at the axially opposed end of said cells, at least one of said groups of scanning electrodes being at least semi-transparent;
    (c) each scanning electrode means including along its circuit extent a discontinuity forming an electrical arc gap zone, each electrical arc gap zone being disposed within an individual chamber remote from and in continuation with the closure means of said discharge paths, with the electrical arc gap zones of each group of scanning electrodes having a uniform gap length and being arranged generally along a regularly defined axis, and sharing a common terminal point;

(d) triggering means for energizing said scanning electrodes and comprising a source of electrical potential, and arc initiating means for establishing an arc adjacent at least one electrical gap in each of said groups; and (e) magnetic means for each group of scanning electrodes and including electrical signal drive means for generating a field coupled to the gaps in one of said groups, the field having a direction generally transverse to the gap axis to which it is coupled, and means for energizing said drive means to intermittently step an arc from one gap pair to the next adjacent gap pair along the gap axis.

2. The electro-optical display panel as defined in claim 1 being particularly characterized in that the potential applied across each path by said scanning electrodes is less than the minimum excitation potential for the electro-optical material disposed along said path.

3. The electro-optical display panel as defined in claim 1 being particularly characterized in that information electrodes are applied to each of said discharge paths for applying a field thereto.

4. The electro-optical display panel as defined in claim 3 being particularly characterized in that each of said information electrodes is transparent.

5. The electro-optical display panel as defined in claim 1 being particularly characterized in that each of said discharge paths contains a phosphor for excitation upon application of a potential along said path.

6. The electro-optical display panel as defined in claim 1 being particularly characterized in that the regularly defined axis for the gaps in each of said scanning electrode means is circular.

7. The electro-optical display panel as defined in claim 6 being particularly characterized in that said first group of scanning electrodes forms a vertical scan group, and said second group of scanning electrodes forms a horizontal group, said groups being arranged for operation in synchronism, one group to another.

8. The electro-optical display panel as defined in claim 1 being particularly characterized in that each of said discharge paths is comprised of a discrete family of integral bores, each bore having a discrete phosphor element disposed therein.

9. The electro-optical display panel as defined in claim 1 being particularly characterized in that a high resistance current path is provided across surfaces supporting individual groups of scanning electrodes.

10. The electro-optical display panel as defined in claim 1 being particularly characterized in that means are provided for continuously maintaining an electrical signal across one of said discharge paths to retain a gaseous discharge path therethrough.

11. The electro-optical display panel as defined in claim 1 being particularly characterized in that a plurality of information electrodes are provided, each information electrode being coupled to at least one of said discharge paths, and means for applying an information signal to said information electrodes, the magnitude of the sum of said information signal and said scanning electrode signal being greater than the signal required to initiate and sustain a discharge along said paths.

12. The electro-optical display panel as defined in claim 1 being particularly characterized in that the electrical gap zone of said scanning electrode means is disposed in spaced relationship from said closure means so as to form a gap zone having length, width and depth dimensions, the arrangement being such that an electrical arc spanning any of said gap zones is spaced from said closure means.

References Cited
UNITED STATES PATENTS

| | | | |
|---|---|---|---|
| 2,878,420 | 3/1959 | Groendijk | 315—84.6 |
| 2,942,150 | 6/1960 | Ullery | 315—169 |
| 3,042,834 | 7/1962 | Nicoll | 315—169 |
| 3,262,010 | 7/1966 | Kazan | 315—169UX |
| 3,334,269 | 8/1967 | L'Heureux | 315—169UX |

DONALD J. YUSKO, Primary Examiner

D. L. TRAFTON, Assistant Examiner

U.S. Cl. X.R.

178—7.3; 313—108; 315—169, 338; 340—324